A. W. THOMAS.
COMBINED WEIGHING AND PACKING MACHINE.
APPLICATION FILED OCT. 31, 1916.
1,246,354.
Patented Nov. 13, 1917.
4 SHEETS—SHEET 1.
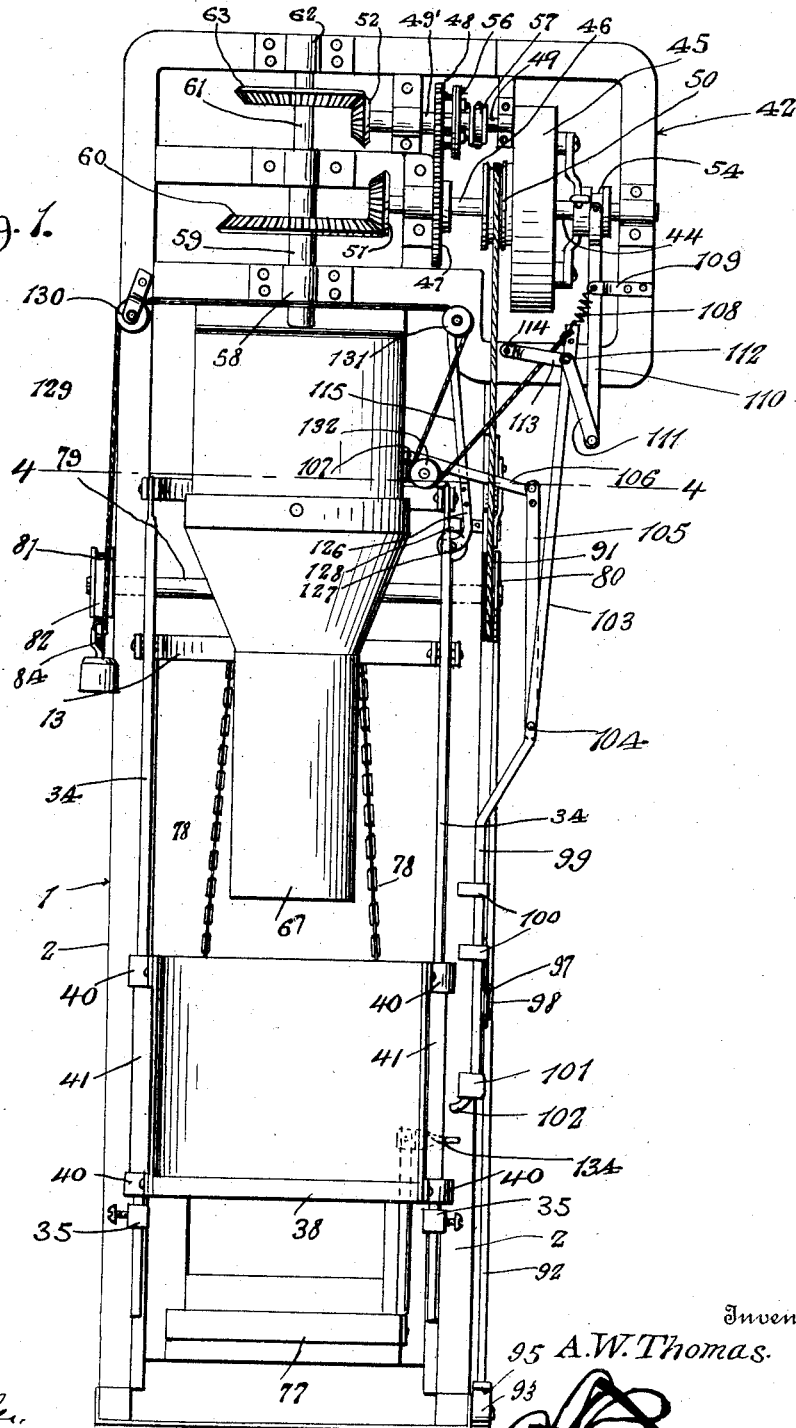
Fig. 1.
Witness:
Inventor
A.W. Thomas.
Attorney

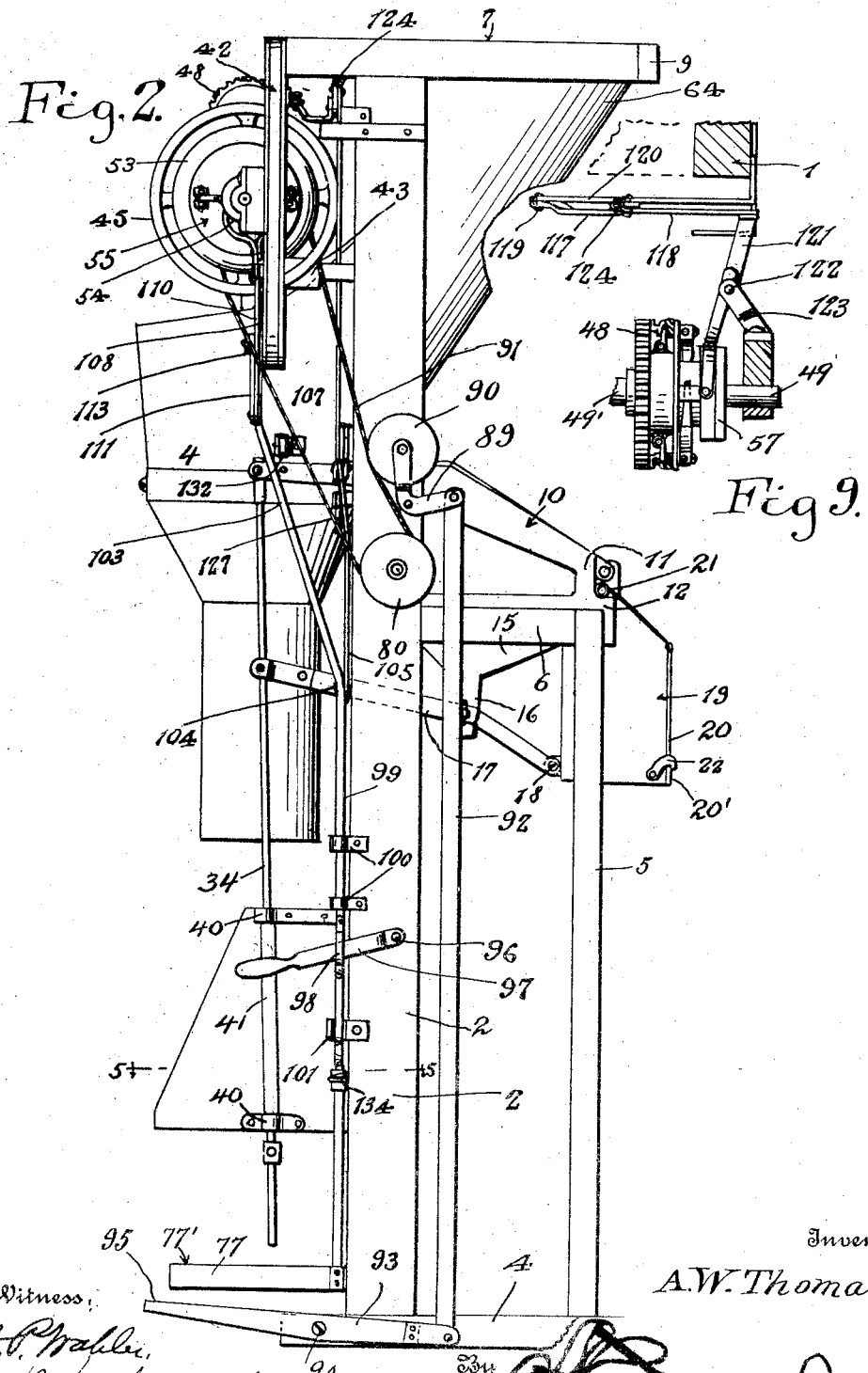

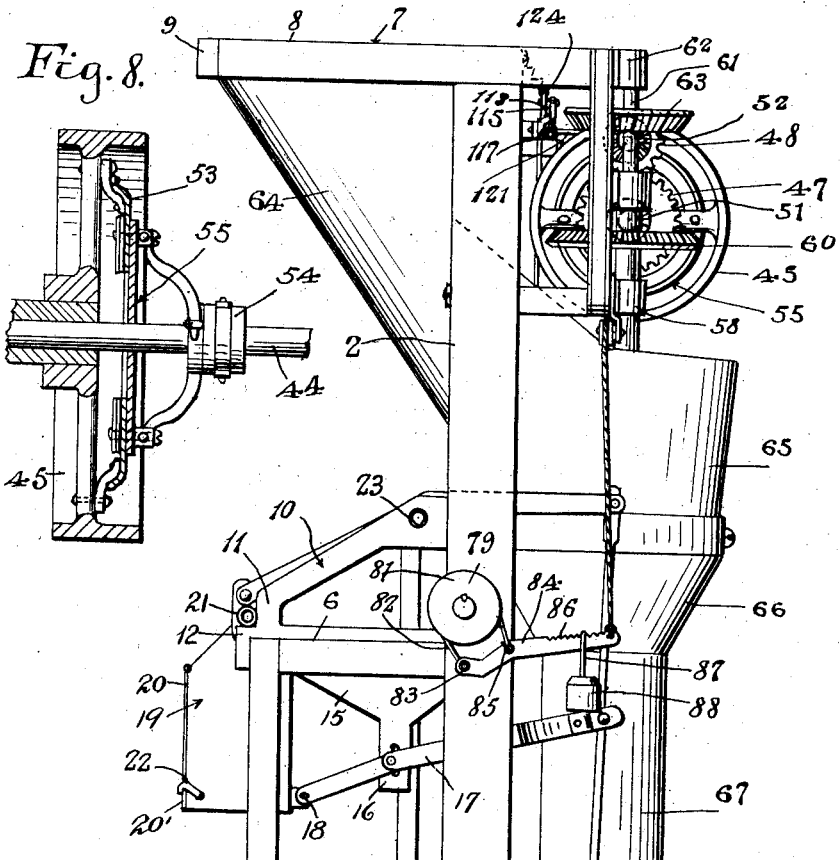

A. W. THOMAS.
COMBINED WEIGHING AND PACKING MACHINE.
APPLICATION FILED OCT. 31, 1916.
1,246,354.
Patented Nov. 13, 1917.
4 SHEETS—SHEET 4.
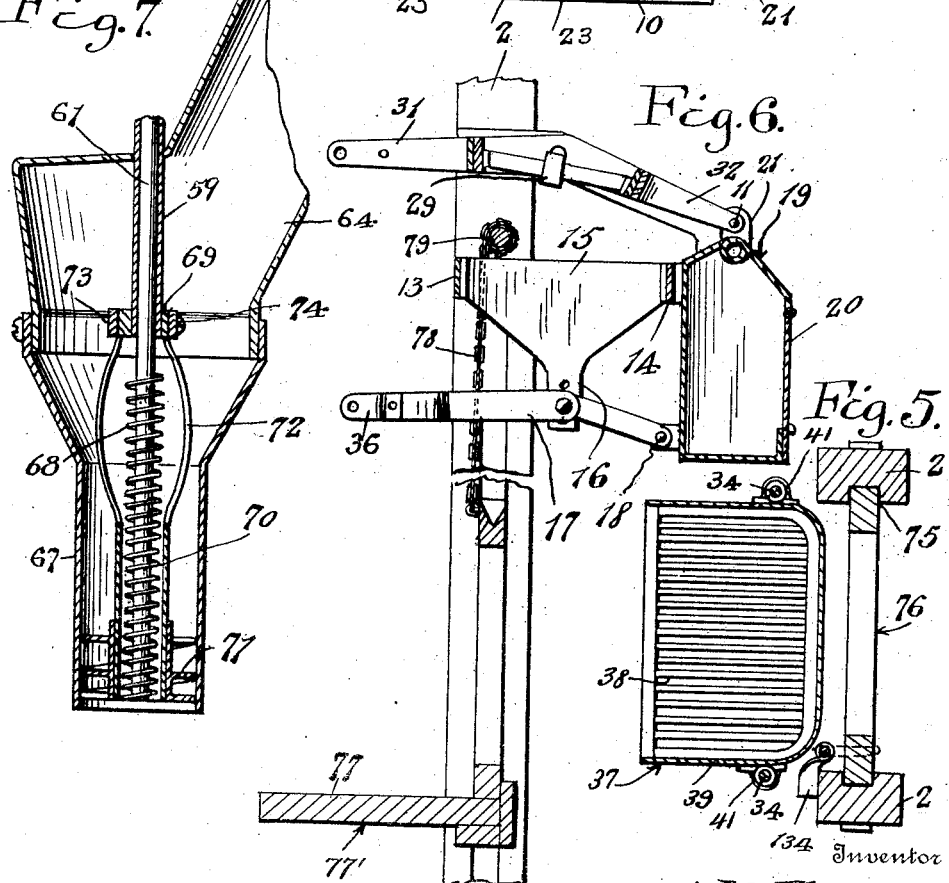

UNITED STATES PATENT OFFICE.

ALBERT W. THOMAS, OF PORTLAND, OREGON.

COMBINED WEIGHING AND PACKING MACHINE.

1,246,354.  Specification of Letters Patent.  Patented Nov. 13, 1917.

Application filed October 31, 1916. Serial No. 128,711.

*To all whom it may concern:*

Be it known that I, ALBERT W. THOMAS, a citizen of the United States, residing at Portland, in the county of Multnomah and State of Oregon, have invented certain new and useful Improvements in Combined Weighing and Packing Machines; and I do hereby declare the following to be a full, clear, and exact description of the invention, such as will enable others skilled in the art to which it appertains to make and use the same.

This invention relates to new and useful improvements in combined weighing and packing machines and is particularly adapted for use in flour mills and similar places where packages of flour, meal and the like are handled and packed in bags, barrels and similar receptacles.

Another object of the invention is to provide a packer for packing the material in the receptacles, the operation of which is automatically stopped when the proper amount of material has been placed in the receptacle which amount is governed by a weight.

A further object of the invention is to provide an automatically operated scale releasing device which is actuated when a predetermined quantity of material has entered the receptacle to release the supporting platform of the scale so as to allow the same to be suspended on the scale beam in order that a proper balance between the receptacle and weight by which the same is balanced may be insured.

A further object of the invention is to provide a lifting carriage by means of which the scale platform is raised to operative position with relation to the packing augers.

Still another object of the invention is to provide a novel form of packing auger having a feeding auger extending centrally therethrough which augers are so constructed as to prevent any leakage of the material being packed thereby avoiding the wasting of the material.

A further and more specific object of the invention is to provide a scale platform consisting of a plurality of bars arranged in the form of grid which is provided to allow any flour which might fall thereon to pass through and on to the carriage so as to avoid interference with the weighing of the contents of the receptacle.

A still further object of the invention is to provide a means by which the rotation of the feeding and packing augers may be automatically controlled.

A still further object of the invention is to provide a device wherein the raising of the carriage and the operating of the augers is effected through a single main drive shaft to which the power is applied by means of a belt and pulley or any other suitable driving mechanism.

With these and other objects in view the invention consists in the novel combination and arrangement of parts which will be fully set forth in the following specification and accompanying drawings, in which:—

Figure 1 is a front view in elevation of a combination packer and weigher constructed in accordance with this invention.

Fig. 2 is a side view of the device illustrating the various control levers.

Fig. 3 is a side view of the device taken from the side opposite Fig. 2.

Fig. 4 is a horizontal sectional view on line 4—4 of Fig. 1.

Fig. 5 is a horizontal sectional view on line 5—5 of Fig. 2.

Fig. 6 is a fragmentary vertical sectional view through the device illustrating the scale beam or balance arm.

Fig. 7 is a vertical sectional view through a portion of the hopper and neck illustrating in detail the construction of the augers.

Fig. 8 is a vertical sectional view through the clutch on the main drive shaft, and Fig. 9 is a horizontal sectional view illustrating the clutch on the counter shaft.

Referring now to the drawings 1 designates as an entirety the main frame of the device consisting of a pair of vertical side bars 2 held in spaced parallel relation by a top bar and the bottom connecting strip 3. The lower ends of the vertical side bars 2 rest on the feet 4 which extend in spaced parallel relation rearwardly from the bars 2. Secured to and extending upwardly from the upper sides of the feet 4 are the standards 5, the upper ends of which are connected to suitable horizontal bars 6, the forward ends of which connect to the bars 2 intermediate their ends. A horizontal rectangular frame designated generally by the numeral 7 is attached to the upper ends of the bars 2 and the connecting bar at the upper end of the bars 2 forms the forward wall of the frame 7 while the sides of said frame are formed by the side bars 8, the rear ends of which are connected by the bar 9. The forward ends of the side bars 8 extend forwardly from the front face of the bars 2 in a manner clearly illustrated in Fig. 3.

Secured to the upper bars 6 of the main frame is the scale supporting frame designated generally by the numeral 10 which comprises a plate having its rear edge cut away so as to form a downwardly inclined portion which terminates in a vertical portion 11, the lower end of which terminates in a horizontal shoulder 12 which forms a stop for the rear end of the scale beam to prevent the same from lowering beyond a predetermined point. The frame 10 comprises two plates formed as above described which are attached to the inner faces of the vertical side bars 2 and the horizontal bars 6 and these plates are connected adjacent their forward edge by a transversely extending horizontal bar 13 which is arranged in the same plane with a rear bar 14 connecting the plates. Attached to the bars 13 and 14 intermediate their ends is a substantially triangular plate 15 having its apex disposed downwardly and provided with the stem 16 to which is pivoted a lever 17 having its rear end pivotally connected at 18 to the weight box 19 which is connected at the rear end of the balance arm to be more fully hereinafter described. This weight box 19 is provided with a door 20 by means of which the weights are introduced to the interior and the upper end of said weight box is provided with a longitudinally extending bar 21 which projects beyond the ends of said box as illustrated in Fig. 4 to form stops for engaging the stop 12 hereinbefore referred to in order to limit the downward movement of said box. The door 20 hereinbefore described is provided with suitable ears 20′ which project from the longitudinal ends thereof adjacent the lower edge, which ears 20′ are adapted to be engaged by suitable catches 22 which are pivoted to the end walls of the box as will be clearly seen upon reference to Figs. 2 and 3. Formed adjacent the upper edge of each of the plates 10 is an opening 23 in which the pivot pins of the balance arm are rockably mounted. These pivots are preferably knife edged as illustrated so as to afford the greatest accuracy of the device.

The scale beam or balance arm hereinbefore referred to is best illustrated in Fig. 4 and comprises a pair of side bars 24 and 25. Each of these bars comprises a pair of angular sections arranged in the manner illustrated in Fig. 6 and provided centrally with suitable openings for the reception of the knife edged pivot pins hereinbefore referred to. The bars 24 and 25 are held in spaced parallel relation by the transversely extending bars 27 which are connected intermediate their ends by a suitable balance arm 28 on which a balance weight 29 is slidable. Suitable auxiliary side bars 30 which are shaped to conform to the shape of the bars 24 and 25 are riveted or otherwise attached to the bars 27 at a spaced distance inwardly from the inner faces of the bars 24 and 25 and these bars 30 coöperate with the bars 24 and 25 in holding the pivot pins in proper position. A suitable curved yoke 31 is attached between the forward ends of the bars 24 and 25 and a similar yoke 32 is attached between the rear ends of said bars. The ends of the yokes are extended for a short distance in a plane parallel with the bars 24 and 25 but are held in spaced relation by means of suitable spacing blocks 33 and extending between the arms 24 and 25 and the extensions on the yokes are suitable knife edged pivot pins on which the weight box and the supporting rods for the balancing platform are pivotally mounted. It will be understood that the weight box is mounted at the rear end of the balance arm while the supporting rods for the platform are mounted on the forward end.

The platform supporting rods hereinbefore referred to are designated by the numeral 34 and extend downwardly from the forward ends of the bars 24 and 25 and have adjustably mounted thereon suitable set collars 35 which are adapted to limit the downward movement of the platform to be more fully hereinafter described. Pivoted near the upper end of each bar 34 is one of the arms 36 of the arm 17 and it will thus be seen that swinging movement of the rods 34 with relation to the bars 2 is eliminated.

The weighing platform hereinbefore referred to is designated generally by the numeral 37 and comprises a platform or grid 38 having attached thereto a suitable shield 39 which extends around the side and rear edges of the platform in a manner clearly illustrated in Fig. 5. Attached to the portions of the shield forming the side walls are suitable cleats 40 which form slides on the rods 34 and between which the guide tubes 41 are mounted.

Having described the weighing apparatus the description of the packing mechanism will now proceed and upon reference to Figs. 1 and 2 it will be seen that a suitable sub frame designated generally by the numeral 42 is attached to the forward ends of the bars 8 while the lower edge of said frame is supported on suitable studs 43 attached to the bars 2 at a slight distance from their upper ends. Journaled horizontally in the frame 42 is the main drive shaft 44 having loosely mounted thereon a pulley 45. This pulley is attached to a sleeve 46 which is rotatable therewith and has attached to its opposite end a pinion 47 which is secured to a sleeve 49' which meshes with the pinion 48 which in turn is loosely mounted on the counter shaft 49. A pulley 50 is mounted on the sleeve 46 adjacent the pulley 45 and connected to the end of the shaft 44 opposite that on which the pulley 45 is mounted is a bevel pinion 51 the use of which will appear as the description proceeds. A similar bevel pinion 52 is mounted on the end of the counter shaft opposite that on which the pinion 48 is rotatably mounted as will be clearly seen upon reference to Fig. 1. In order to control the rotation of the main shaft 44 from the pulley 45, the pulley is provided with a ring 53 which is attached to the spokes thereof and is spaced outwardly therefrom for a short distance. A grooved sleeve 54 is slidably mounted on the drive shaft 44 which sleeve is provided with a peripheral groove for the reception of a suitable ring provided with pivot studs arranged at diametrically opposite points to which the upper end of the controlling lever is pivotally connected. This sleeve 54 is adapted to control a suitable clutch mechanism designated generally by the numeral 55 which operates in conjunction with the drive pulley 45 so that when the clutch is thrown into operative position the shaft 44 will be rotated.

A suitable clutch mechanism designated generally by the numeral 56 is arranged on the counter shaft 49 and like the clutch previously described is provided with a grooved sleeve 57 which is slidable on the shaft and which is adapted to be surrounded by a ring having studs thereon which are connected to an operating lever to be more fully hereinafter described. The clutch 56 acts in conjunction with the pinion 48 which is rotatably mounted on the counter shaft and it will be seen that when the clutch 56 is in operable position the counter shaft will be driven by the pinion.

Journaled in suitable bearings 58 carried by the horizontal bars of the frame 42 is a suitable tubular shaft 59 having its upper end provided with a bevel gear 60. A shaft 61 is operable through the tubular shaft 59 and is journaled at its upper end in a bearing 62 arranged on the top horizontal bar of the frame 42. Secured to the shaft 61 near its upper end is a bevel gear 63 which meshes with the bevel gear 52 while the bevel gear 60 meshes with the bevel pinion 51. The shaft 61 is adapted to operate the feeding auger which will be more fully hereinafter described and which is located at the lower end of said shaft.

Secured in the frame 7 is a hopper 64 which is provided at its lower forward end with a spout 65 having attached thereto a funnel 66 which terminates at its lower end in a cylindrical spout 67. The spout 67 is located slightly forwardly of the forward faces of the side bars 2 and is adapted to direct the flour, meal or other material into bags located on the platform 37.

The feeding auger hereinbefore referred to is best illustrated in Fig. 7 and consists of a spiral blade 68 which extends from the lower end of the shaft 61 up to a point well up on the same. The tubular shaft 59 extends downwardly on the shaft 61 from the gear 60 to a point slightly above the upper end of the spiral blade 68 and this tubular shaft is provided with a collar 69 to which the packing auger is attached. The packing auger above referred to comprises a cylindrical shell 70 having its lower end surrounded by a pair of spiral ribs 71 which are relatively wide and are of such a diameter as to completely close the mouth of the spout 67. The sleeve 70 is provided intermediate its ends with a plurality of longitudinal slits and the metal between the slits is bulged out as at 72 to form openings through which the flour or other meal passes into the feeding auger when the device is in use. The upper ends of the bulged portions 72 join a collar 73 which is attached to the collar 69 by means of a set screw 74. It will thus be seen that when the hollow shaft rotates the packing auger will also be rotated.

Now passing to the detail description of the carriage on which the scale platform is supported during the packing operation reference will be had particularly to Figs. 1, 5 and 6. The vertical side bars 2 have formed in their inner faces suitable guide grooves 75 in which the frame designated generally by the numeral 76 is slidably mounted. This frame 76 is provided at its lower end with a suitable outwardly extending table 77 and the whole forms the carriage 77' on which the balancing platform is supported when the device is in its raised position. Attached to the upper end bar of the frame 76 are a pair of chains 78 the upper ends of which are attached to a shaft 79 provided at one end with a pulley 80 and at its opposite end with a brake wheel 81 which is surrounded by a brake band 82, one end of which is fixed to the pivot 83 of a lever 84. The opposite end of the brake band is fixed at 85 to the lever 84 and this lever is provided with a plurality of notches 86 in which the bail 87 of a suitable weight 88 engages in order to hold the weight in various adjusted positions on said lever so that the tension on the brake band may be varied to meet various requirements. It will thus be seen that the weight will serve to retard the lowering movement of the carriage and by adjusting the same along the lever the pressure of the packing auger on the contents of the receptacle mounted on the scale platform may be varied. In order to provide a means for controlling the raising of the carriage a suitable bell crank lever 89 is pivotally connected to one of the side bars and has one of its ends provided with an idler pulley 90 which is adapted to engage against the drive belt 91 for the pulley 80 so that when said bell crank is moved the idler will cause the belt 91 to tighten and thus the pulley 80 will be driven from the pulley 50. The opposite arm of the bell crank 89 is pivotally connected to the upper end of a push rod 92, the lower end of which is connected to the rear end of a lever 93 which is pivoted at 94 to one of the feet 4. The forward end of said lever 93 forms a foot pedal 95 by means of which the lever may be actuated.

It will be understood that during the upward travel of the carriage the shaft 79 is free to rotate as the weight is relieved from the brake band in a manner to be more fully hereinafter described.

Pivotally connected at 96 to one of the vertical side bars 2 is a lever 97 which is adapted to engage the upper and lower bars of a frame 98 carried by the clutch operating rod designated by the numeral 99 which is slidable through suitable brackets 100 secured to the bar 2 to which the lever 97 is pivoted. A suitable keeper 101 is attached to the bars 2 to which the lever 97 is pivoted and the lower end of the rod 99 is provided with an inwardly curved portion 102 provided with a notch which forms a shoulder which in turn is adapted to engage the keeper 101 when the lever is moved downwardly. The upper end of the rod 99 is offset as at 103 and has pivoted thereto at 104 a link 105, the upper end of which is pivoted to a bifurcated lever 106 which in turn is pivoted at 107 to the hopper. The upper end of the offset portion 103 of the rod 99 has attached thereto a retractile coil spring 108 which is attached at its upper end to a bracket 109 so that when the rod 99 is moved downwardly the spring 108 will be tensioned. Pivoted to the bracket 109 is the clutch actuating lever 110 the upper end of which is bifurcated and provided with openings to receive the studs carried by the ring which is mounted in the groove in the sleeve 54. It will thus be seen that upon movement of the lever the sleeve will be moved in such a manner as to cause the clutch to engage or disengage. A link 111 is pivoted to the lower end of the lever 110 while the opposite end of said link is pivoted at 112 to the rod 99 adjacent its upper end. A link 113 is pivoted to the pivot point 112 and the opposite end of said link is pivoted at 114 to the frame 42. It will thus be seen that upon downward movement of the offset portion 103 of the rod 99, the links 111 and 113 will tend to straighten thereby forcing the lower end of the lever 110 outwardly and moving the clutch into engagement. It will thus be seen that the main shaft clutch is controlled by the downward movement of the rod 99.

In order to control the clutch 56 on the counter shaft 49 a lever 115 is pivoted at its upper end to the pivot point 116 of a pair of links 117 and 118. The adjacent ends of which are pivoted together at the pivot point of the lever 115 while the outer end of the link 117 is pivoted at 119 to a bracket 120 which is attached to one of the frame bars 2. The opposite end of the link 118 is pivoted to a lever 121 which in turn is pivoted at 122 to a bracket 123 which is mounted on the frame 42 and the lever 121 is provided with a bifurcated end having openings therein which are adapted to receive the studs on the ring surrounding the sleeve 57 of the clutch 56. It will thus be seen that when the links 117 and 118 straighten the lever 121 will be moved to cause the clutch member 56 to become active. In order to return the clutch in position a suitable retractile coil spring 124 is connected to the upper horizontal bore of the frame 1 and to the pivot point of the links 117 and 118 and it will thus be seen that the rod 115 will normally tend to move upwardly. In order to pull the same downwardly when the clutch 56 is moved into active position the lower end of said rod is provided with a pair of arms 126 which project downwardly and are curved inwardly and have rotatably mounted between their lower inner ends a suitable roller 127 which is adapted to engage a keeper 128 attached to the bar 2. The upper ends of the arms 26 form shoulders against which the lower side edges of the bifurcated lever 106 engage when the rod 99 is pulled downwardly and it will be seen that as soon as the rod 115 is moved downwardly the roller will engage the keeper 128 and due to the inward pull of the lever 106 and of the spring 124 it will be apparent that the roller will move over so that its center is positioned slightly inwardly of the lower edge of the keeper and thus the clutch 56 will be locked in operative position. When in this position it will be seen that the roller will be in the path of the scale beam so that upon downward movement of said beam the roller will be released and thus the operation of the feeding auger will be automatically discontinued.

In order that the brake 81 may be automatically operated upon the throwing in of the clutches 55 and 56 a suitable flexible connection 129 is attached to the extreme outer end of the lever 84 and passes over a pulley 130 secured to the frame 42 and thence over a similar pulley 131 attached to the frame near its opposite end from whence the flexible member passes over a pulley 132 mounted on a bracket on the hopper and the end of said flexible member is then connected to the extreme upper end of the rod 99 thus it will be seen that upon downward movement of the rod the weight 88 will be free to act to move the brake band 82 into operative engagement with the brake wheel 81 but when the rod 99 is moved upwardly the flexible member 29 will be moved to lift the weight 88 upwardly and thus release the tension on the brake band 82 thereby leaving the shaft 79 free to rotate by the belt 91.

In order to automatically release the clutches after a predetermined quantity of material has been placed in a receptacle which has been positioned on the scale platform the carriage 77' is provided with a vertical guide rod 133 on which is adjustably mounted a trip arm 134 which projects outwardly so that its path is intercepted by the curved end 102 of the rod 99. It will thus be seen that when the carriage is up and the receptacle is being packed the packing auger will gradually force the receptacle together with the platform and carriage downwardly against the tension of the brake band until the trip arm 134 engages the curve portion 102 of the rod 99 at which time the rod 99 will be moved outwardly so that the shoulder formed by the recess near the lower end thereof disengages the keeper 101 and the said rod will thus move upwardly under the influence of the spring 108 and thereby release the clutch 55. Simultaneously with this movement the platform 37 will engage the stop 35 on the hanger rod 34 thereby causing the balance arm to swing on its pivot and this action will cause the forward end of said balance arm to engage the roller 127 and thereby move the same away from engagement with the keeper 128 thus leaving the rod 115 free to move upwardly under the influence of the spring 124. In this way it will be seen that the clutch 56 will be freed and thus the rotation of the feeding auger will simultaneously be cut off. The upward movement of the rod 99 will of course exert pull on the flexible member 129 and thereby lift the weight 88 upwardly thus releasing the tension of the brake band 82 on the brake drum 81 thereby allowing the shaft 79 to be freely rotated when pressure is applied to the treadle portion 95 of the lever 93.

From the foregoing it will be apparent that an efficient flour weighing and packing apparatus is provided which is practically automatic in its operation and will save considerable time in the handling of flour, meal and similar materials which are weighed and packed in bags and barrels.

In the operation of the device it will be seen that a receptacle of any suitable type is placed on the platform 38 of the scales and the operator then presses his foot on the treadle portion 95 of the lever 93, thereby causing the wheel 90 to tighten on the belt 91, and thus set the wheel 80 to rotating thereby revolving the shaft 79 and causing the chain 78 to be wound thereon so as to raise the carriage 77' until it engages the platform 38, at which time the whole will be raised until the spout 67 of the hopper is positioned within the receptacle. The upward movement of the carriage 77' will cause the finger 134 mounted thereon to pass the finger 102 on the pull rod 99 and after the device has been raised to proper position the hand lever 98 is operated to move the pull rod 99 downwardly thereby causing the links 113 and 111 to straighten and throw the clutch 55 into operation. Simultaneously with this movement pull is exerted on the link 105 thereby moving the lever 106 downwardly and causing pull to be exerted on the pull rod 115 which will straighten the links 117 and 118 thereby rocking the lever 121 and throwing the clutch 56 into operation. The operating of the clutches will cause their respective shafts 44 and 49 to rotate thereby driving the pinions 51 and 52 which in turn rotate their gear wheels 60 and 63 respectively to cause the tubular shaft 59 and the inner shaft 61 to rotate, thus driving the feeding and packing augers. After a predetermined quantity of material has been placed in a receptacle it will be apparent that the weight of the same will overcome the friction of the brake 79 which has been holding the platform and carriage in raised position and the platform will descend thereby causing the finger 134 to engage the releasing finger 102 of the pull rod 99 and allowing the rod to move upwardly. The descent of the platform causes the lower end thereof to contact with the set collars 35 and it will thus be seen that the same will be suspended on the scale beam and held upwardly by means of the weight within the weight box 19. The upward movement of the rod 99 releases the clutch 55 and thereby discontinues the operation of the packing auger. However, the clutch 56 still remains in operation so that the feeding auger will feed a relatively small quantity of the material into the receptacle until the weight within the weight box 19 is overcome by the weight of the receptacle and its contents, at which time the platform will move downwardly thereby exerting pull on the rods 34 and causing the scale beam to rock so as to engage the wheel 128 thereby forcing the same out of contact with the catch and allowing the pull rod 115 to move upwardly thereby throwing the clutch mechanism 56 out of operation after which the receptacle may be removed and is ready for sealing.

While in the foregoing there has been shown and described the preferred embodiment of this invention, it is to be understood that such changes may be made in the combination and arrangement of parts as will fall within the spirit and scope of the invention as claimed.

What is claimed is:—

1. A device of the class described including a hopper, a feeding and packing auger operable in the hopper, a spout leading from the hopper, a weighing platform vertically slidable beneath the spout, a carriage normally supporting the weighing platform out of operative position, said carriage being adapted to automatically release said weighing platform when a predetermined quantity of material has been packed and means operated automatically upon the releasing of the weighing platform to stop the operation of the feeding and packing augers.

2. In a device of the class described, a hopper, a spout at the lower end of the hopper, a feeding and packing auger operable within the spout, a vertically slidable weighing platform beneath the spout, guide rods on which said platform is slidable, stops near the lower ends of the guide rods to prevent the platform from moving downwardly beyond a predetermined point without actuating the weighing mechanism, a carriage for supporting the weighing platform upwardly and out of engagement with the stops, said carriage moving downwardly as the material is packed within the receptacle due to the pressure of the packing auger and means for discontinuing the operation of the feeding and packing augers when the carriage moves downwardly to free the weighing platform.

3. In a device of the class described, a hopper, feeding and packing augers operable with relation to the hopper, a weighing platform beneath the feeding and packing augers, a carriage supporting the weighing platform, and clutches released by the lowering of the carriage to stop the operation of the feeding and packing augers.

4. In a device of the class described, a hopper, feeding and packing augers operable with relation to the hopper, a weighing platform beneath the feeding and packing augers, a carriage supporting the weighing platform, a driving mechanism for the feeding and packing augers, and means released by the lowering of the carriage to disconnect the driving mechanism and the augers.

5. In a device of the class described, a hopper, feeding and packing augers operable with relation to the hopper, a weighing platform beneath the feeding and packing augers, a carriage supporting the weighing platform, a driving mechanism for the feeding and packing augers and clutches released by the lowering of the carriage to disconnect the driving mechanism from the feeding and packing augers.

In testimony whereof I affix my signature in presence of two witnesses.

ALBERT W. THOMAS.

Witnesses:
CLARENCE E. OSBORNE,
PEARL OSBORNE.

Copies of this patent may be obtained for five cents each, by addressing the "Commissioner of Patents, Washington, D. C."